Feb. 6, 1951            H. E. VAN DORN            2,541,000
DRAFT GEAR CUSHION
Filed Dec. 1, 1945                                    2 Sheets-Sheet 1
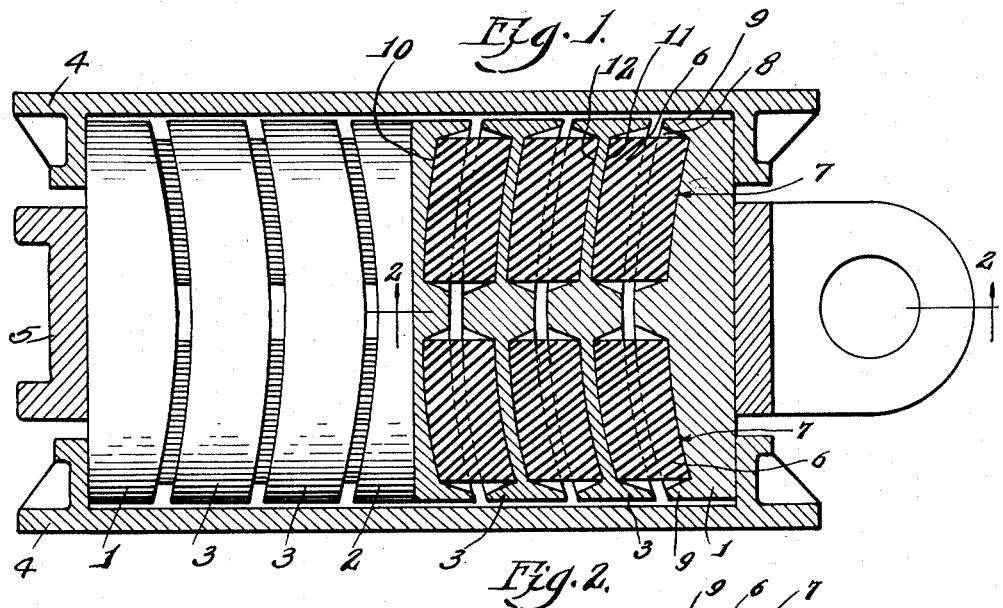
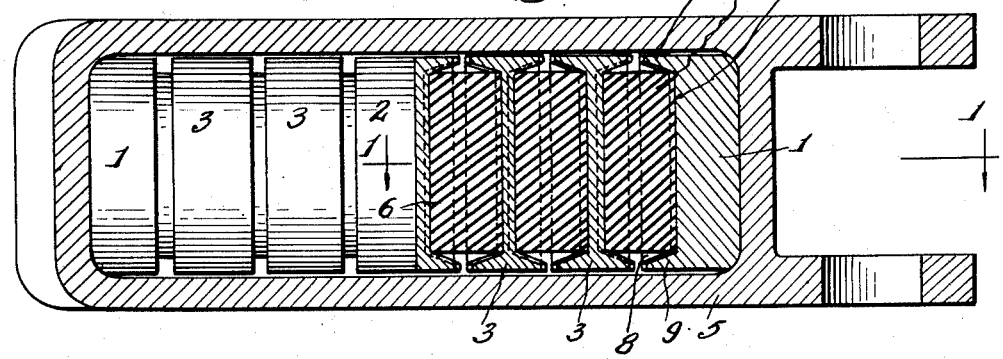
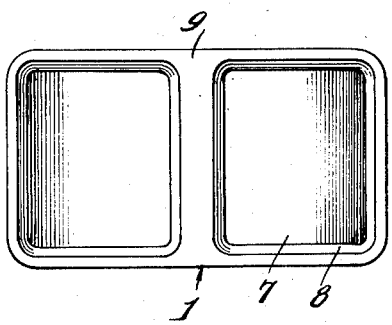
Inventor
Herbert E. Van Horn
By Wm F. Freudenreich,
Attorney Feb. 6, 1951 H. E. VAN DORN 2,541,000
DRAFT GEAR CUSHION
Filed Dec. 1, 1945 2 Sheets-Sheet 2
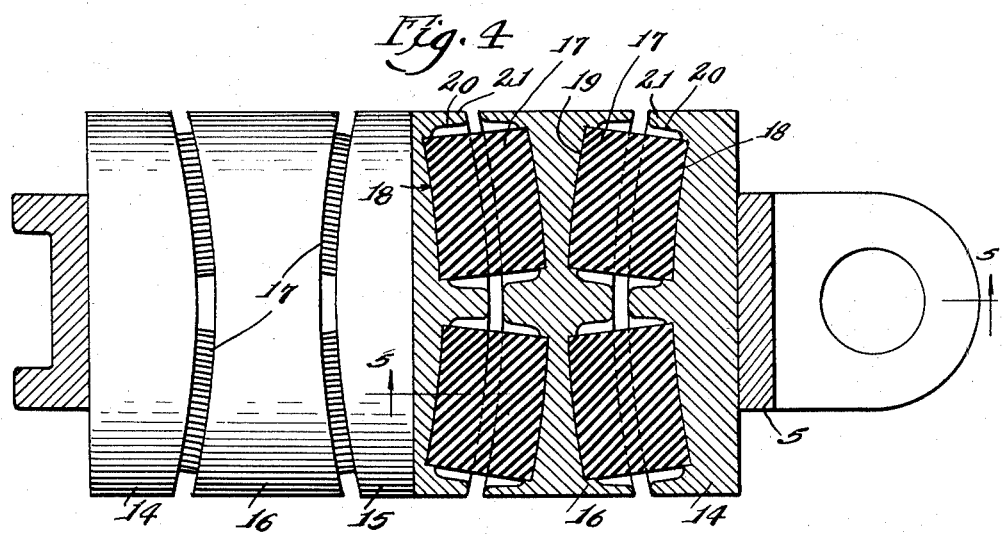
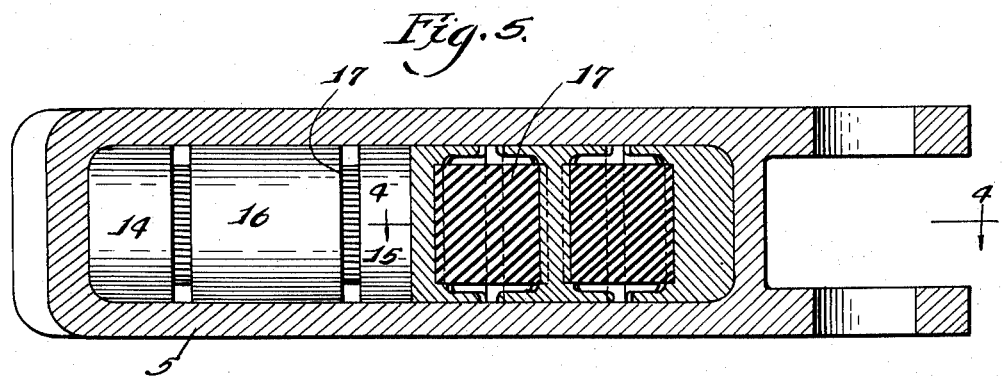
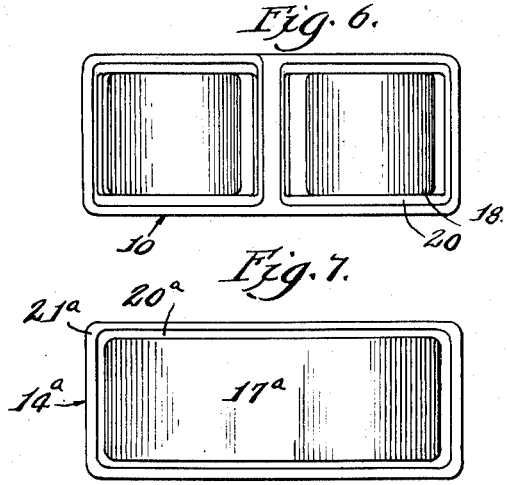
Inventor:
Herbert E. Van Dorn,
Wm. F. Freudenreich,
By
Attorney.

Patented Feb. 6, 1951

2,541,000

UNITED STATES PATENT OFFICE 2,541,000

DRAFT GEAR CUSHION

Herbert E. Van Dorn, Chicago, Ill., assignor to The Dornvan Corporation, a corporation of Illinois Application December 1, 1945, Serial No. 632,242

3 Claims. (Cl. 213—44)

While rubber has been used to some extent as a substitute for metal springs in railway draft gears, such use has not become nearly as extensive as could be expected because of the eminently successful use of rubber in other fields where even more severe conditions are encountered.

The object of the present invention is to produce a simple and novel cushion for draft gears in which rubber is employed as the resilient element in such a manner as to utilize all of the good characteristics of the rubber, without introducing faults that heretofore have militated against its use in this field.

The various features of novelty whereby the present invention is characterized will hereinafter be pointed out with particularity in the appended claims; but, for a full understanding of the invention and of its objects and advantages, reference may be had to the following detailed description taken in connection with the accompanying drawings, wherein:

Figure 1 is a view, partly in plan and partly in section on line 1—1 of Fig. 2, of a draft gear cushion embodying a preferred form of my invention, together with conventional cheek plates which support and a drawbar yoke which embraces the cushion; Fig. 2 is a view, partly in elevation and partly in section on line 2—2 of Fig. 1, showing the same elements as in Fig. 1 except the cheek plates; Fig. 3 is a face view of the right hand rigid follower plate or washer of Figs. 1 and 2; Fig. 4 is a view similar to Fig. 1, the cheek plates being omitted, showing a slight modification, the plane on which the partial section is taken being indicated by line 4—4 of Fig. 5; Fig. 5 is a view, partly in side elevation and partly in section, on line 5—5 of Fig. 4, showing the same elements as appear in Fig. 4; Fig. 6 is a face view of the right hand rigid follower plate or washer of Figs. 4 and 5; and Fig. 7 is a view similar to Fig. 6, illustrating a slightly modified form of rigid plate and the corresponding rubber slab, made in one piece instead of two, in position thereon.

Referring to Figs. 1–3, 1, 1 are like end follower plate or washer members, 2 is a middle follower plate or washer member and, between the latter member and each end member is a group of like intermediate follower plate or washer members 3; each such group consisting of two members in the particular construction illustrated. All of these members are about as long and as wide as the conventional follower plates or washers in draft gear cushions using metal springs; thus being adapted, for example, to span the distance between conventional cheek plates 4, 4 mounted on the center sills of railway cars, and to be embraced by any usual yoke 5 positioned midway between and parallel to the cheek plates.

The end plates have curved inner surfaces or faces and flat outer surfaces or backs, the curvature being lengthwise of the plates and crosswise of the cars on which the draft gear is mounted. The radius of curvature should be large enough to cause the arc subtended by the length of a plate to be fairly flat. Generally speaking, a radius of about two feet is satisfactory. The middle follower member has curved faces on both sides, the curvature being the reverse of or complementary to that of the end members. In other words, when the faces of the end members are convex, as shown, those of the middle member are concave. Members 3 are concavo-convex, so that the members of each pair are nested one in the other and are, as a pair, in nested relation with the middle follower member and the corresponding end member.

Between each rigid plate member and next member, on either side, is a thick slab 6 of rubber or rubber-like material shaped to conform to the curved surfaces engaged therewith; the parts being so proportioned that when the rigid members are assembled in stack formation as shown, with the elastic slabs between them as shown to produce a cushion, the slabs must be placed under a susbtantial initial stress to allow the assembly to be entered in the yoke and between stops on the cheek plates or the like. Each rubber slab, in the arrangement shown, is composed of two equal sections lying on opposite sides of the longitudinal axis of the cushion. The parts of the cushion are therefore symmetrically disposed with respect to a longitudinal central vertical plane and with respect to a transverse central vertical plane, and the structure is perfectly balanced.

Since the bodily lengthwise movements permitted car couplers are very limited in extent, the rubber slabs must be able to offer the maximum resistance required, without being greatly reduced in thickness while doing so. I therefore so construct the rigid plate or washer members that the rubber is compressed from various directions in much the same way that a snowball is squeezed between two hands in compacting it. To accomplish this, the rigid parts are formed with pockets for the slabs; these pockets being of such a size and shape as to leave above, below and at the ends of each slab or slab section only a small amount of space into which the rubber can expand as the load comes on the cushion. The pockets are flaring, increasing in length and width from the bottom to the top, so that under a push or pull on the yoke the compression is such that the rubber comes progressively into engagement with the sides of the pockets, beginning at the bottom. Therefore, before the rigid members can come into metal to metal contact with each other, each piece of rubber is being powerfully gripped and compressed from all sides. It will be seen that the curved surfaces 7 of the end plates may be said to constitute the bottoms of deep pockets or recesses 8 or to be the working faces of the end plates surrounded by ledges 9 rising from such faces and having sloping inner surfaces. Similarly the curved faces 10 of member 2 and the faces 11 and 12 of each member 3 may be said to be the bottoms of pockets or the working faces of the intermediate plate members surrounded by ledges.

By using rubber slabs that are long, wide and thick, they are able to survive indefinitely when subjected to forces so powerful that rapid deterioration of smaller, thinner and lighter pieces would be caused thereby.

In Figs. 4, 5 and 6 there is shown a slightly different construction. This construction is adapted for use where the length and width are or may be the same as in Figs. 1 to 3, whereas the vertical dimension is much less, say four inches instead of six inches in the other form.

In this second form of cushion there are only five follower plate or washer members, namely two end members 14, 14, a middle member 15, and two intermediate members 16, 16. Thus there are only four gaps to be occupied by slabs 17, each of which is shown as being in two sections, as in the first form. The faces 18 of the two end members and on both sides of the middle member are alike and, therefore, the faces 19 of both sides of each intermediate member also also alike but of a curvature the reverse of that of the faces on the other three members. Since the faces 18, in the arrangement shown, are convex, faces 19 are concave, the radius of both convex and concave surfaces being the same. It will be seen that the two rubber slabs in each end of the cushion are oppositely disposed, being symmetrically positioned with respect to the mid plane of the corresponding follower plate member 16; the arrangement being exactly alike in both ends. Each slab section is housed partly in each of two pockets 20, or may be said to be surrounded by ledges 21 protruding from the curved faces of the rigid members and spaced a little apart from the top, bottom and end faces of each slab section.

Fig. 7 shows an end follower member 14ª and a one-piece rubber slab 17ª engaged therein; the only difference between this construction and that of Figs. 4-6, otherwise, being that there is only one long pocket 20ª and, therefore, only a border flange or ledge 21ª, without any such cross element of the latter as is the case in Figs. 4 and 6.

While the present invention may be used in various railway draft gears, it is particularly well suited for use in lieu of the cushion composed of groups or stacks of flat spring plates alternating with followers and spacers in draft gears such as disclosed in my Patent 2,286,590.

While I have illustrated and described with particularity only a single preferred form of my invention, together with some slight modifications in the form thereof, I do not desire to be limited to the exact structural details so illustrated and described; but intend to cover all forms and arrangements coming within the definitions constituting the appended claims; and intend, also, that "rubber" shall include all rubberlike materials.

I claim:

1. A cushion for a railway draft gear comprising a group of parallel rigid plates about as long and as wide as the follower plates in a conventional all metal cushion for such a draft gear, the faces on adjacent plates opposing each other being curved from one end to the other of the plates and being complementary to each other, thick slabs of rubber alternating with said plates and each at all times engaging with, and conforming to the curvature of, both of the faces between which it lies, and stops on the plates that establish metal to metal contact between plates whenever they are moved toward each other sufficiently to compress the intervening rubber slabs to a predetermined degree.

2. A cushion for a railway draft gear comprising a group of parallel rigid plates about as long and as wide as the follower plates in a conventional all metal cushion for such a draft gear, the faces on the adjacent plates opposing each other being complementary to each other, thick slabs of rubber alternating with said plates and each at all times engaging with, and conforming to the curvature of, both of the faces between which it lies, and ledges on the plates to form with the curved faces pockets within which the slabs are contained and which pockets are closed, through contact between opposed ledges, when the plates are pressed together to a predetermined extent.

3. A cushion for a railway draft gear comprising a group of parallel rigid plates about as long and as wide as the follower plates in a conventional all metal cushion for such a draft gear, the faces on adjacent plates that oppose each other being curved from one end of the plates to the other and being complementary to each other, thick slabs of rubber alternating with said plates and each at all times engaging with, and conforming to the curvature of, both of the faces between which it lies, ledges on the plates to form with the curved faces pockets within which the slabs are housed and which pockets are closed, through contact between opposed ledges, whenever the plated move toward each other sufficiently to compress the slabs to a predetermined degree; and there being between the edges of the slabs and the ledges spaces that are free when the cushion is in a state of minimum compression and into which the rubber is forced when maximum compression of the cushion is reached.

HERBERT E. VAN DORN.

REFERENCES CITED

The following references are of record in the file of this patent:

UNITED STATES PATENTS

| Number | Name | Date |
|---|---|---|
| 37,283 | Evans | Jan. 6, 1863 |
| 40,218 | Vose | Oct. 6, 1863 |
| 2,165,383 | Johnson et al. | July 11, 1939 |
| 2,260,532 | Lindeman | Oct. 28, 1941 |
| 2,404,637 | Jones | July 23, 1946 |